UNITED STATES PATENT OFFICE.

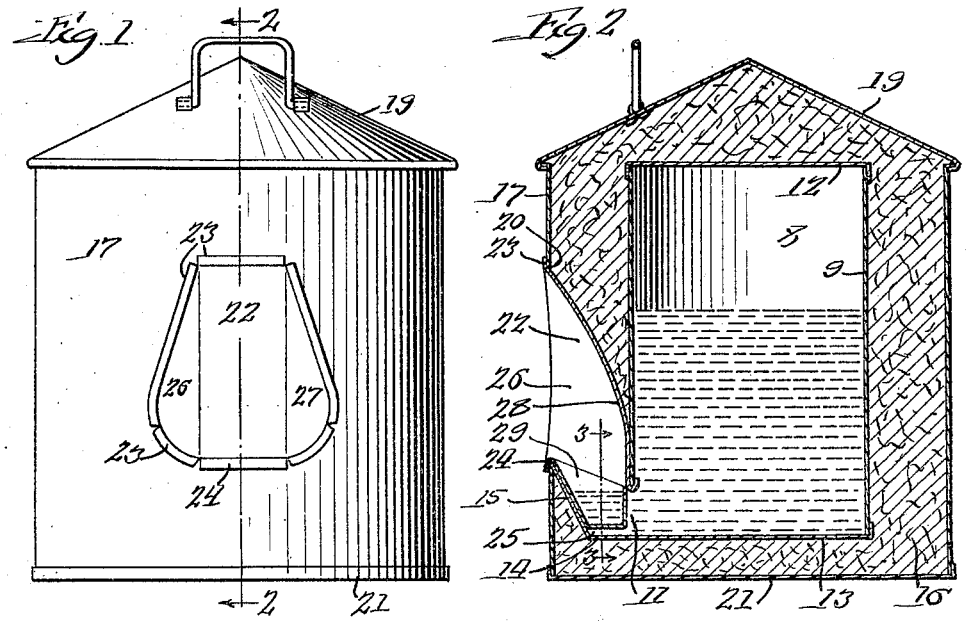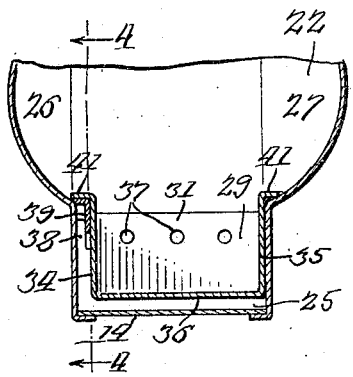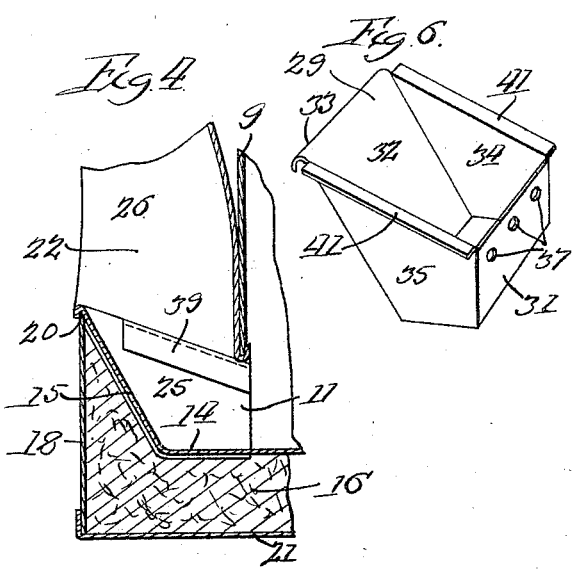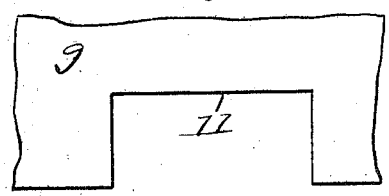

FRED PAGEL, OF ROCKFORD, ILLINOIS.

POULTRY FOUNTAIN.

1,402,953. Specification of Letters Patent. Patented Jan. 10, 1922.

Application filed June 1, 1920. Serial No. 385,647.

*To all whom it may concern:*

Be it known that I, FRED PAGEL, a citizen of the United States, residing at Rockford, in the county of Winnebago and State of Illinois, have invented certain new and useful Improvements in Poultry Fountains, of which the following is a specification:

This invention pertaining to poultry fountains, has for its principal object the provision of a so-called self-filling fountain insulated against freezing, so constructed that it may be produced very economically and will serve in a practical and effectual manner the purposes for which it has been designed.

Another important object is the provision in a poultry drinking fountain of the character described, of a removable drinking or trough cup designed to prevent pollution of the water and to promote sanitation. Ordinarily in drinking fountains of this character, the trough proper is open to accumulations of foreign matter which work into the reservoir and pollute the water. My improvement overcomes this disadvantage.

My invention contemplates an improved trough and air vent structure embodying but few parts advantageously arranged, thereby promoting economy in manufacture.

Other objects and attendant advantages will be appreciated as the invention becomes better understood by reference to the following description when considered in connection with the accompanying drawings, in which—

Figure 1 is a front elevation of a poultry fountain embodying my invention;

Fig. 2, a vertical sectional view through the fountain taken on the line 2—2 of Fig. 1;

Figs. 3 and 4, sectional views taken substantially on the lines 3—3 and 4—4 of Figs. 2 and 3 respectively;

Fig. 5, a detail front view of the lower portion of the reservoir; and

Fig. 6, a perspective view of the removable trough.

A poultry fountain of the type to which my invention relates is characterized, generally stated, by the provision of a water reservoir, packed in a suitable insulation within a casing and having a lower outlet accessible through one side of the casing, providing a relatively small drinking trough, to which the water is automatically fed from the reservoir and maintained at a given level by atmospheric pressure.

In the present case, I have provided a reservoir designated generally by character 8, comprising a cylindrical wall 9 having a rectangular opening 11 along its lower edge, shown in Fig. 5, sealed at its upper end by a top 12 and having a bottom 13 provided with a portion 14 extending through the opening 11 and terminating in an upwardly inclined portion 15, which provides the front sub-wall of a drinking trough.

This reservoir is packed by suitable insulation material 16 within a casing designated generally by character 17, which preferably comprises a cylindrical wall 18 to which is secured suitable top and bottom members 19 and 21 respectively. The insulation may be of any material suitable for the purpose, a very economical filling being sawdust or wood shavings.

The wall 18 of the casing has an opening of the shape indicated in Fig. 1 for the reception of a one-piece trough-throat member designated generally by character 22. This member 22 is pressed or shaped from a single piece of sheet material to provide marginal flanges 23 adapted to fit against the outside of the casing wall 18 around the opening 20, with the exception of the downturned end 24 of the bottom piece 15, and to converge inwardly from said flanges, providing a throat leading to the trough compartment 25. It will be observed that the side walls 26 and 27 are shaped to provide a relatively wide throat, which terminates at its lower end in the narrowed trough compartment, the lowermost edges of these walls being secured to the bottom portions 14 and 15 of the receptacle. The inner vertical wall 28 of the trough-throat member is turned under and engaged with the top edge of the wall defining the opening 11. The top of this opening 11 is below the top of the trough compartment 25 so that the water will be maintained at a proper level in said compartment.

I have now provided a removable drinking trough or cup adapted to fit in the trough compartment and to be freely removable at will. This drinking trough designated generally by character 29, has a vertical rear wall 31, a front wall 32 inclined in conformance with the inclination of the wall 15 and having a flanged upper end 33 hooked over the upper end of the flange 24 and sides 34, 35 and a bottom 36 joining the front and rear walls. By means of openings 37 through the rear wall 31, water is admitted to the drinking cup. It will be noted viewing Figs. 3 and 4, that an air vent 38 is provided at one side of the compartment 25, reaching from the opening 11 to a point above the water line in the trough compartment, this air vent being formed of a sheet metal piece 39 soldered or otherwise secured to the side wall 26 of the trough-throat member. The sides 34 and 35 of the drinking trough may be formed with top flanges 41 which rest on the shoulders formed by the sides of the trough-throat member so as to properly support the drinking trough in position.

By reason of the foregoing construction, it will be readily seen that the drinking trough 29 may be removed when filling the reservoir, which is turned back on one side in the usual manner, the air in the reservoir escaping through the vent 38. When in use, the drinking trough catches any dirt or foreign matter which may be blown thereinto, or washed from the bills of poultry when drinking. At suitable intervals, the drinking trough may be removed and cleaned. Thus, the water in the reservoir may be kept clean, and the troublesome task of cleaning a poultry fountain not equipped with my improvements is entirely avoided. It is also desirable to remove the trough for the purpose of repairing the bottom thereof, which in time becomes worn through as a result of the poultry pecking on the bottom 36. It will thus be obvious that the removable trough protects the bottom 14 and enables quick repairing of leaks. It will be further observed that by reason of the one-piece trough-throat member 22 constructed as described above, and of the construction of the parts cooperating with such member, a poultry fountain of this character may be produced at comparatively low cost.

It is believed that the foregoing conveys a clear understanding of the objects prefaced above, and while I have illustrated and described but a single working embodiment thereof, it should be understood that various changes might be made in details of construction without departing from the spirit and scope of the invention as expressed in the appended claims, in which—

I claim:

1. In a poultry fountain of the character described, the combination of a reservoir insulated within a casing, a one-piece trough-throat member associated with said reservoir and casing and providing a widened throat converging inwardly and downwardly and defining the sides of a narrow trough compartment, the reservoir being shaped to communicate with the trough compartment, and a drinking trough adapted to be positioned in said compartment and having flanged sides resting on the converging side walls of the throat member.

2. In a poultry fountain of the character described, the combination with a reservoir packed in a casing, the casing and reservoir being respectively formed with a throat opening and a trough-feed opening, the latter being lower than the former, and a trough-throat member having marginal edges secured to the casing at the sides and top of its throat opening and having sides defining a widened throat opening and a restricted trough compartment, the bottom of the reservoir having a forwardly extending and upwardly inclined member secured at its upper end to the casing along the bottom edge of its throat opening, said bottom member defining the bottom and front of the trough compartment and being secured at its sides to the sides of said trough-throat member.

3. A poultry fountain of the character described comprising a casing, a reservoir packed within the casing, the reservoir having at its lower end a trough-feed opening, the casing having a throat opening positioned above said trough feed opening and being of substantially greater width than said trough feed opening, a one piece trough throat member marginally engaged and secured to the sides and top of the throat opening and having inwardly and downwardly converging sides which provide a widened throat and define at their lower ends the sides of a restricted trough compartment communicating with the trough feed opening, and a drinking trough removably positioned in said compartment.

FRED PAGEL.